United States Patent [19]

Nguyen

[11] Patent Number: 5,930,238
[45] Date of Patent: Jul. 27, 1999

[54] ASYNCHRONOUS TRANSFER MODE (ATM) MULTICAST TREE DELIVERY SWITCHING

[75] Inventor: Annie Thanhvan Nguyen, Newport Beach, Calif.

[73] Assignee: General DataComm, Middlebury, Conn.

[21] Appl. No.: 08/891,176

[22] Filed: Jul. 10, 1997

[51] Int. Cl.[6] .................................................. H04Q 11/04
[52] U.S. Cl. .......................... 370/260; 370/270; 370/395; 370/486
[58] Field of Search ..................................... 370/260, 270, 370/329, 337, 395, 397, 401, 410, 471, 486, 496, 522; 395/200.2, 200.04, 306

[56] References Cited

U.S. PATENT DOCUMENTS

| | | | |
|---|---|---|---|
| 4,686,698 | 8/1987 | Tompkins et al. | 379/53 |
| 4,710,917 | 12/1987 | Tompkins et al. | 370/62 |
| 4,847,829 | 7/1989 | Tompkins et al. | 370/62 |
| 5,014,267 | 5/1991 | Tompkins et al. | 370/62 |
| 5,594,732 | 1/1997 | Bell et al. | 370/471 |
| 5,768,280 | 6/1998 | Way | 370/486 |
| 5,805,804 | 9/1998 | Laursen et al. | 395/200.02 |
| 5,812,552 | 9/1998 | Arora et al. | 370/401 |

*Primary Examiner*—Douglas W. Olms
*Assistant Examiner*—Shick Hom

*Attorney, Agent, or Firm*—David P. Gordon; David S. Jacobson; Thomas A. Gallagher

[57] ABSTRACT

Multimedia multipoint conferencing and distance learning sessions utilizing the ATM network use multimedia conferencing equipment at remote sites coupled to the ATM network via ATM network interface switches. All ATM switches are coupled to, and receive control information from a network manager (NM). An application server (AS) is coupled to the NM, and is also coupled to conferencing equipment via an out-of-band connection such as ETHERNET, to which the conferencing equipment is also connected. To establish a multimedia multipoint conference, the AS sends information regarding the participants to the NM. At conference time, the NM establishes a plurality of SPVC multicast trees from each participating site to all other participating sites in the conference, and activates one multicast tree and deactivates all others. An application running on a computer system at a main site tracks requests from remote sites for recognition. A request is recognized via a command sent from the main site to the AS which causes the NM to deactivate the previously activated multicast tree, and activate the already set up, but non-activated multicast tree from the recognized site to the main and other sites. Control is re-obtained by the main site by sending another command to the AS which causes the NM to deactivate the then active multicast tree and to reactivate the previous multicast tree from the main site to all remote sites.

20 Claims, 11 Drawing Sheets

ASYNCHRONOUS TRANSFER MODE (ATM) MULTICAST TREE DELIVERY SWITCHING

BACKGROUND OF THE INVENTION

1. Field of the Invention

The present invention relates generally to the field of telecommunications. More particularly, the present invention relates to methods and apparatus for the set-up and implementation of multimedia multipoint communications utilizing the ATM network. The invention has particular application to distance learning, although it is not limited thereto.

2. State of the Art

Perhaps the most awaited, and now fastest growing technology in the telecommunication field in the 1990's is known as Asynchronous Transfer Mode (ATM) technology. ATM is providing a mechanism for removing performance limitations of local area networks (LANs) and wide area networks (WANs) and providing data transfers at speeds of on the order of gigabits and even terabits/second. The variable length packets of LAN and WAN data are being replaced with ATM cells which are relatively short, fixed length packets. Because ATM cells can carry voice, video and data across a single backbone network, the ATM technology provides a unitary mechanism for high speed end-to-end telecommunications traffic. In addition, each ATM connection is provided with a guaranteed level of service.

With the ability to transfer voice, video and data across a single backbone network, ATM technology has become a natural selection for implementing multimedia (e.g., audio and video) telecommunications. While still in its infancy, multimedia telecommunications, including video-conferencing, is expected to be an area of extremely large growth in the coming years. One area of multimedia telecommunications which is of importance is multimedia, multipoint telecommunications; e.g., video-conferencing with multiple parties. Multimedia, multipoint telecommunications has several applications, including group conferencing at multiple sites, and distance learning.

The field of distance learning typically involves a teacher located at a first location (main classroom), and students located at several different remote locations (remote classrooms). Preferably, in distance learning applications, communications are multi-directional; i.e., the teacher can be seen and heard by the students in the remote locations, and the students at the remote locations can be controllably seen and heard by the teacher and by each other. Control of who is seen and heard is preferably provided to the teacher in the main classroom.

Several different mechanisms for implementing distance learning have been utilized or proposed in the art. As seen in prior art FIG. 1, according to a first prior art arrangement, a call is set up using a cross-connect switch 10 in a standard telecommunications network 15 (i.e., non-ATM-network) between the main classroom 20a, and the remote classrooms 20b–20d, and between each remote classroom and the other remote classrooms and the main classroom. In order to provide multimedia multipoint communications using the standard telecommunications network, large bandwidth dedicated-subscriber lines (e.g., T3) and complex equipment are required for each of the classroom sites. Of course, the cost of maintaining such large bandwidth lines is extremely high, as the line is dedicated (i.e., not switched) and provides an around-the-clock connection, regardless of whether that connection is to be used frequently or infrequently. The cross-connect switch 10 under application software control provides the necessary switching function to emulate the multidirectional connectivity.

Turning to FIG. 2, a first proposed ATM solution to multimedia multipoint communications is shown. In FIG. 2 the ATM network 25 is utilized by the main classroom 40a and the remote classrooms 40b–40d. According to the proposal, two choices in establishing multiple circuits directly between the classrooms are available. A first arrangement involves, at a desired time, using a network manager 30 to provide permanent virtual circuits (PVCs) between each classroom and the ATM network 25 in order to guarantee the availability of the connections. The problem with utilizing PVCs however, is that a meshed network of PVCs connecting each site to the others would be required. The cost of such an arrangement is high, as every location which wishes to be a party to the distance learning application must pay for PVCs to all other locations. In addition, expensive equipment which terminates the mesh of PVCs would be required at every site. To avoid the costs associated with the use of PVCs, and in accord with a second arrangement, the multiple circuits can be established on an as-need basis using switched virtual circuits (SVCs). The problem with utilizing SVCs however, is that each time a connection is needed, (e.g., to add another remote classroom, or to permit a remote classroom to talk) a new circuit must be established which entails a call setup procedure which can take several seconds, particularly where a multipoint connections is required. Indeed, the delay can get even longer when the network is busy, and it is possible the connection can be refused. This interruption of at a minimum several seconds effectively destroys the flow of conversation, and is undesirable in both classroom and multipoint group conferencing situations.

In order to overcome some of the problems of the prior art proposals, there have been additional proposals as seen in FIGS. 3a and 3b to use a multimedia multipoint server 60 in order to establish multimedia multipoint connections between a main classroom 70a and a plurality of remote classrooms 70b–70d via the ATM network 75. In the arrangements of FIGS. 3a and 3b, PVCs or SVCs are established between the classrooms and the multimedia multipoint server 60. In particular, at a designated time, which typically requires prior reservation of the resources of the multipoint server, connections are placed to the server 60 which is programmed to accept the connections and set up the conference. In the arrangement of FIG. 3a, it is seen that the multimedia multipoint server receives audio and video information from each of the classrooms, mixes the information as desired, and forwards copies of the mixed information to the different classrooms. it is noted that the main classroom may receive a mix of information from the remote classrooms, while each of the remote classrooms may receive a copy of information from the main classroom, or from the remote classroom which is asking a question. In the arrangement of FIG. 3b, a similar arrangement is seen, except that instead of sending out multiple copies of information from the multimedia multipoint server, a single copy is sent into the ATM network, and duplicated as required at various switches in the ATM network. Thus, only the classroom with an active speaker or with the student asking a question is seen at each of the other classrooms.

Regardless of whether the arrangement of FIG. 3a or FIG. 3b is utilized, it will be appreciated that the costs associated with establishing the multimedia multipoint conference are high. In particular, the tariff for the use of multimedia multipoint server resources is very high, even where a single output port (FIG. 3b) is being utilized.

SUMMARY OF THE INVENTION

It is therefore an object of the invention to provide apparatus and methods for conducting multimedia multipoint conferencing or distance learning sessions.

It is an additional object of the invention to provide apparatus and methods which are not subject to appreciable time delays during the transaction of a multimedia multipoint conference.

It is a further object of the invention to provide apparatus and methods for conducting multimedia multipoint conferencing via the ATM network without incurring large expenses.

It is another object of the invention to provide a multimedia multipoint distance learning application over the ATM network without necessitating a multimedia multipoint server.

In accord with the objects of the invention, methods and apparatus for multimedia multipoint conferencing or distance learning sessions utilizing the ATM network are provided. In particular, the ATM network is considered to include a plurality of network switches, including ATM network interface switches to which the various sites of conferencing equipment are coupled. The network switches are coupled to, and receive control information from a network manager which may be located inside or outside the ATM network. In accord with the invention, each of the conferencing equipment sites includes multimedia equipment which is coupled to the ATM interface switch. In addition, an application server which is coupled to the conferencing equipment as well as to the network manager is provided. The application server is preferably coupled to the conferencing equipment via an ETHERNET LAN/WAN (to which the conferencing equipment is also connected), although the connection can be via the ATM network if desired.

In accord with the invention, when a site wishes to establish a multimedia multipoint conference, the site provides information regarding the participants to the applications server. In turn, the applications server provides information (typically using SNMP commands) to the network manager at the conference time which establishes (sets up) a plurality of SPVC ("smart" PVC or "semi-permanent virtual connection") multicast trees (although PVC multicast trees can be utilized). Each multicast tree is from a participating site to all other participating sites in the conference, and preferably utilizes the ability of ATM network switches to multicast, where applicable. Thus, a plurality of multicast trees from "originating" sites to "destination" sites are generated. When the conference call is established, one of the multicast trees is activated (typically from a main originating site to all of the remote destination sites). The main site typically also receives a picture of its own site. Typically, concurrently, an application running on a computer system at the main site, e.g., the teacher's location, which utilizes the ETHERNET connections, tracks requests from the remote sites, e.g., the students' locations (via the ETHERNET) for recognition. The main site may recognize any of the requests via a command which is sent from the main site to the applications server, which causes the network manager to deactivate the previously activated multicast tree, and then to activate the already set up, but non-activated multicast tree from the recognized site (now an originating site) to the main and other sites (destination sites). According to the preferred embodiment of the invention, the main site may re-obtain control at any time by sending another command to the applications server which causes the network manager to deactivate the multicast tree from the recognized site and then reactivate the previous multicast tree (from the main site to all remote sites).

Implementation of multimedia multipoint conferencing through the use of a plurality of multicast SPVC trees, overcomes several of the problems of the prior art. In particular, the conference sites need not obtain and pay for multiple interfaces and/or large dedicated bandwidths. Also, because the multicast SPVC trees are established at the beginning of the call, although only one is utilized at a time, the switching time from one tree to another is acceptable (e.g., less than one-half of one second), in contrast to a system which would use SVCs.

According to alternative embodiments, besides establishing a plurality of multicast trees which are activated and deactivated by command from the main site, additional simultaneous connections between the remote sites and the main site may be established. Thus, in accord with a first alternative embodiment, a plurality of additional simultaneous connections are maintained, with the main site using a separate monitor for each remote site. According to another alternative embodiment, only one simultaneous connection is maintained at a time, with the main site including a single monitor and a polling application for viewing the remote sites consecutively.

Additional objects and advantages of the invention will become apparent to those skilled in the art upon reference to the detailed description taken in conjunction with the provided figures.

DETAILED DESCRIPTION OF THE PREFERRED EMBODIMENTS

Figure 1:
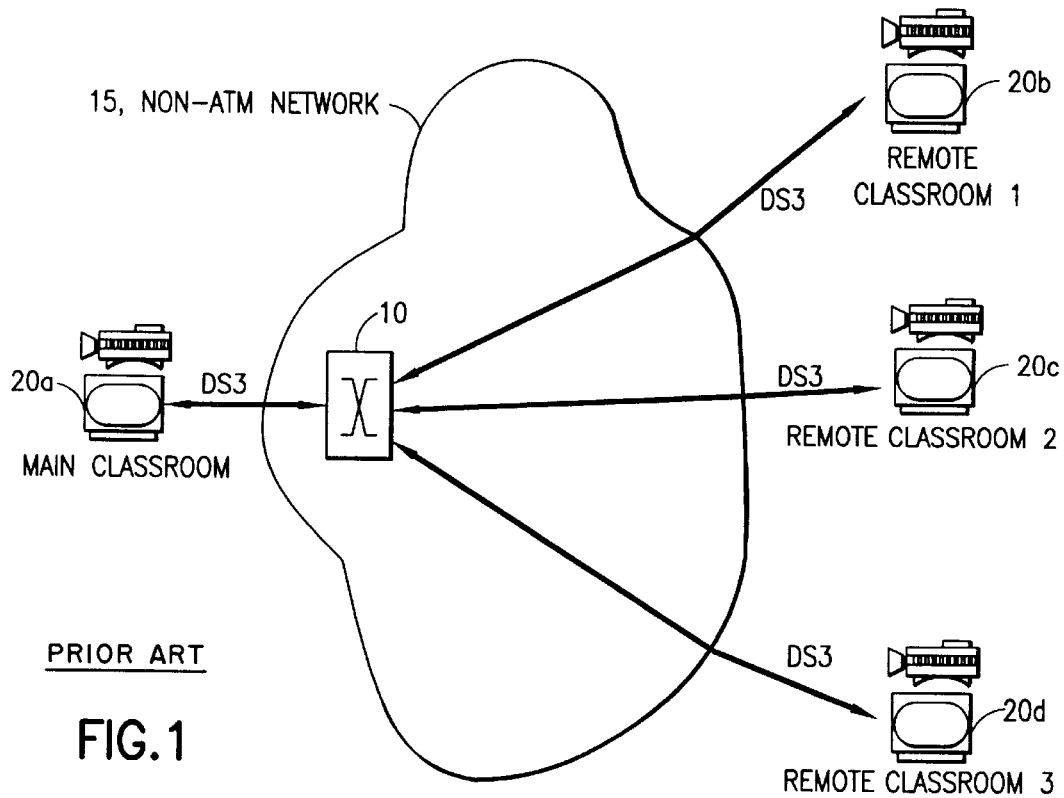
FIG. 1 is a prior art block diagram of a non-ATM network remote learning application.
Figure 2:
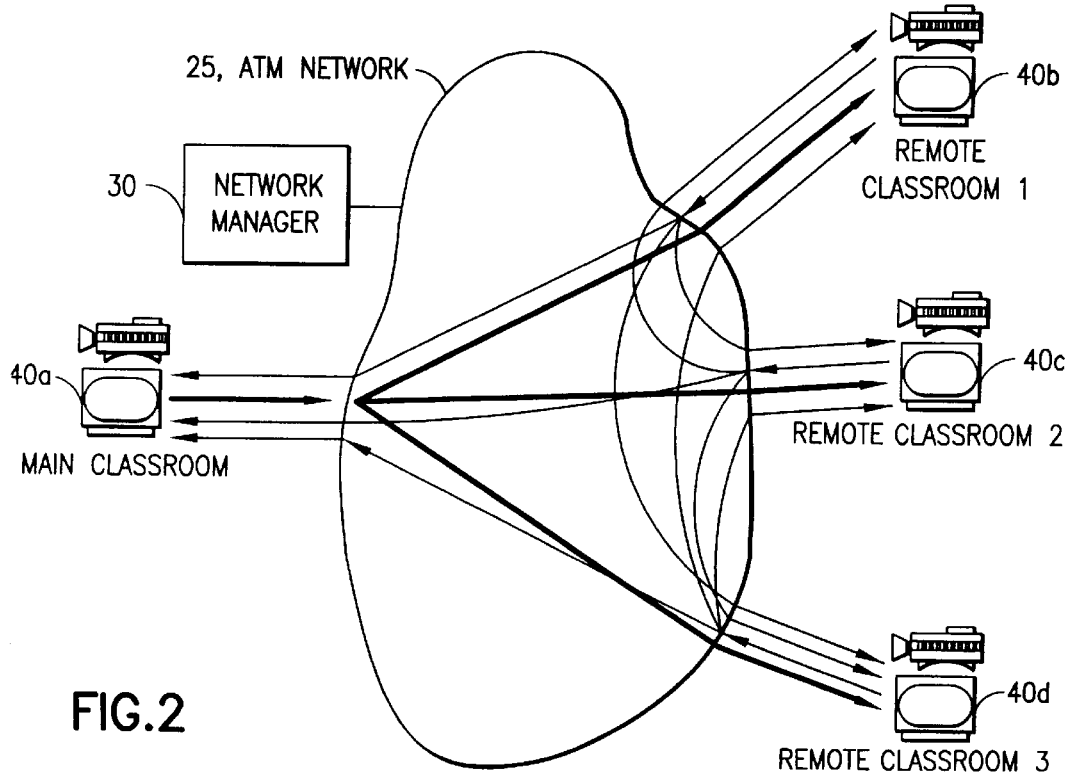
FIG. 2 is a block diagram of an ATM network remote distance learning application using switched or permanent virtual circuits.
Figure 3A:
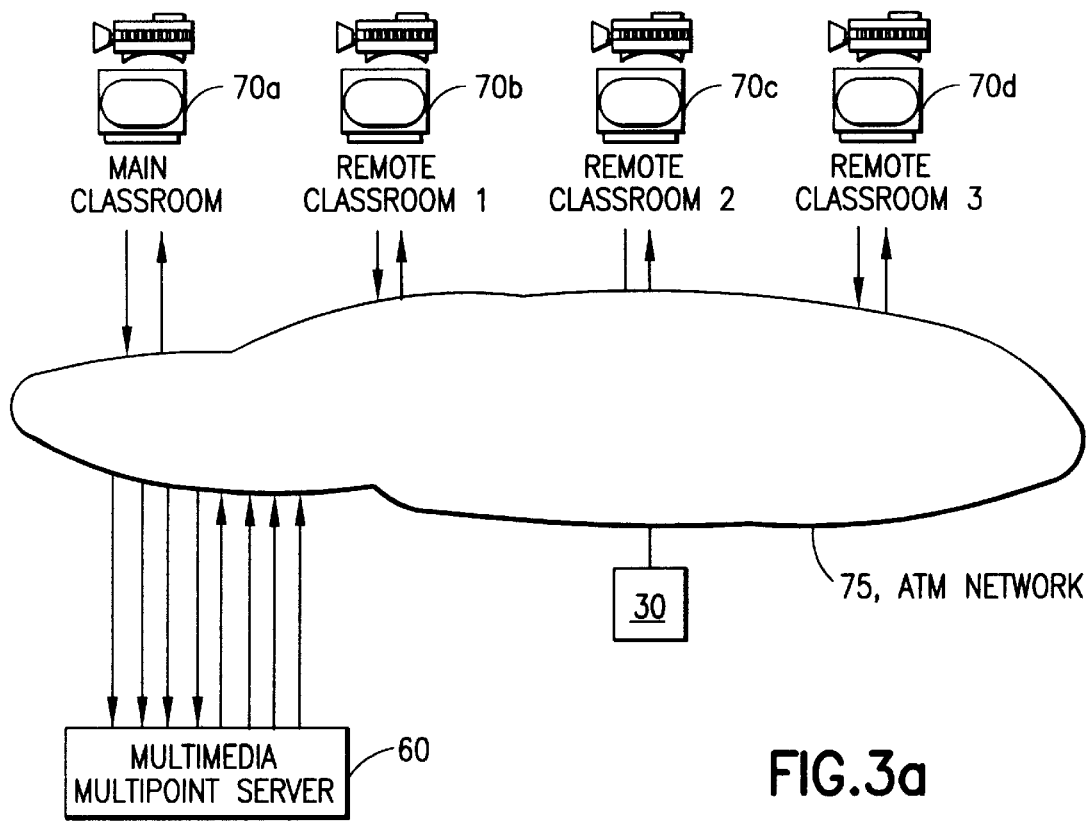
FIGS. 3a and 3b are block diagrams of two embodiments of distance learning applications utilizing multimedia multipoint server resources.
Figure 3B:
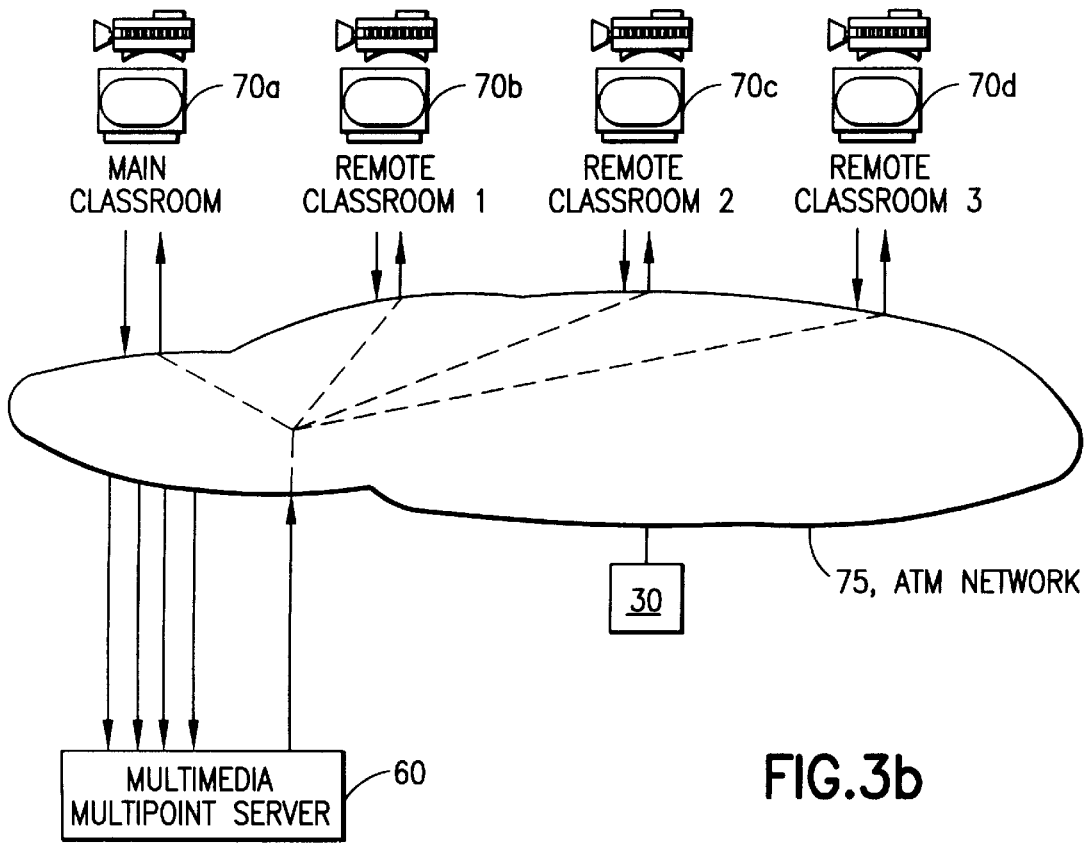
Figure 4:
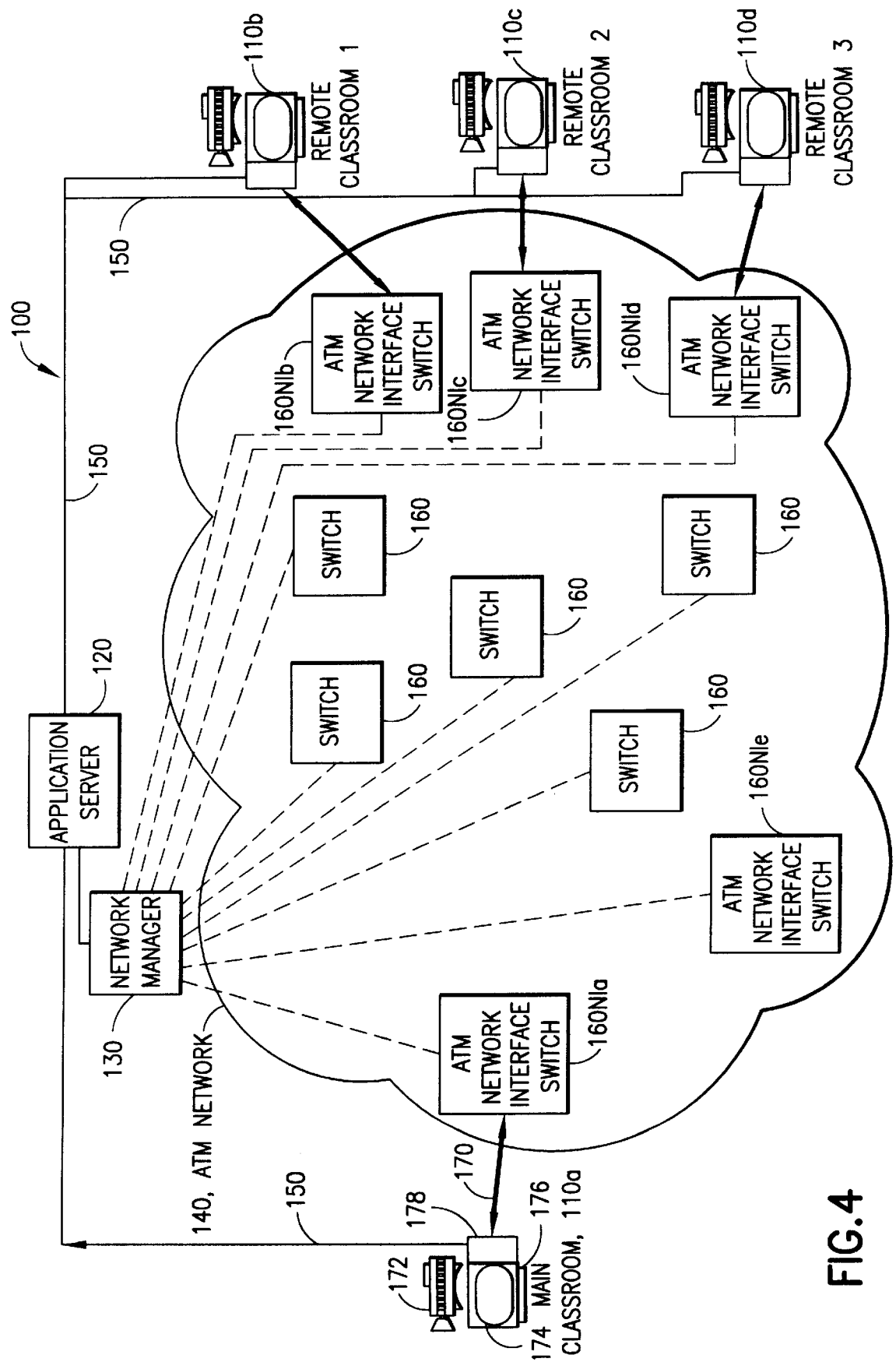
FIG. 4 is a high level block diagram of an ATM network remote distance learning application example according to the invention.

Turning to FIG. 4, a high level block diagram is provided in accordance with the invention of an ATM network remote distance learning application system 100. The system 100 basically includes main site equipment 110a, remote site equipment 110*b*, 110*c*, 100*d* . . ., an application server 120, a network manager 130, the ATM network 140, and preferably a LAN or WAN 150. The ATM network is shown to include a plurality of switches 160 including some switches indicated as network interface switches 160NI*a*–160NI*e*. As indicated in FIG. 4, the equipment at each site is coupled via a telecommunications line 170 (e.g., a DS3) to the ATM network via an network interface switch 160NI. The sites are also coupled to the application server preferably via the LAN or WAN 150 such as an ETHERNET based LAN or WAN; although the ATM network may be used to couple the sites to the application server 120. The application server 120 is connected to the network manager 130 via standard interfaces (e.g., ETHERNET or internet protocol), and may be located at the same physical site as the network manager if desired. The network manager 130, as is known in the art, is coupled to each of the switches 160 of the ATM network via ATM telecommunication connections, although internet protocol (IP) connections may also be utilized.

Each site 110*a*–110*d* preferably includes standard multimedia telecommunications equipment such as a multimedia-ready PC, which is available from COMPAQ, including a camera and microphone 172, a monitor 174, a keyboard 176, and a computer processor system 178. Details of such systems are well known in the art, and will not be given herein, except to note that the camera and microphone, monitor and keyboard are connected to the processor system 178, and the processor system 178 is coupled to the ATM network via a telecommunications line 170. However, for purposes of the present invention, it is noted that some details of the processor system 178 have been changed in order to implement the invention, and details for that implementation are discussed hereinafter with reference to FIGS. 6*a* and 6*b*. For the purposes of FIG. 4, it should suffice to note that the processor systems 178 of the main and remote sites 110*a*–110*d* are coupled to an application server 120 preferably via a WAN or LAN 150, which is preferably the ETHERNET. While it is known in the art to provide an ETHERNET connection to each site for purposes of establishing reservations at a multipoint control unit (also known as an MCU or MMU), in accord with the present invention, and as will become more apparent in the ensuing discussion below, the ETHERNET connection is utilized both for reservations and for permitting out-of-band communications between the various sites 110*a*–110*d* for purposes of controlling the conference. It is noted that instead of using a WAN or LAN out-of-band arrangement, other out-of-band arrangements which utilize the ATM network could be provided. However, for purposes of discussion below, an ETHERNET connection is assumed.

Figure 6A:
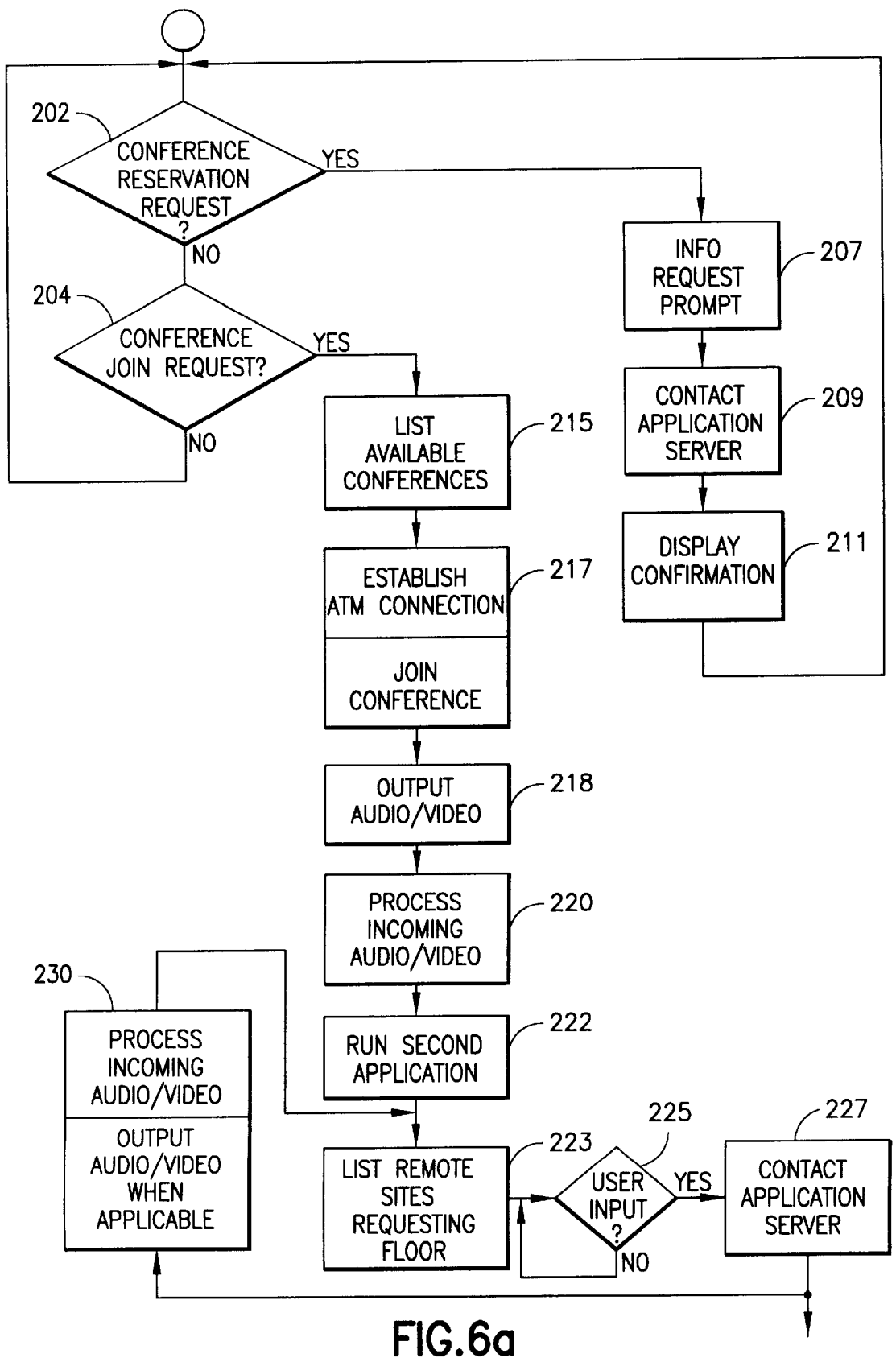
FIG. 6a is a flow diagram for the remote distance learning function of the microprocessor for the main site of the application of FIG. 4.
Figure 6B:
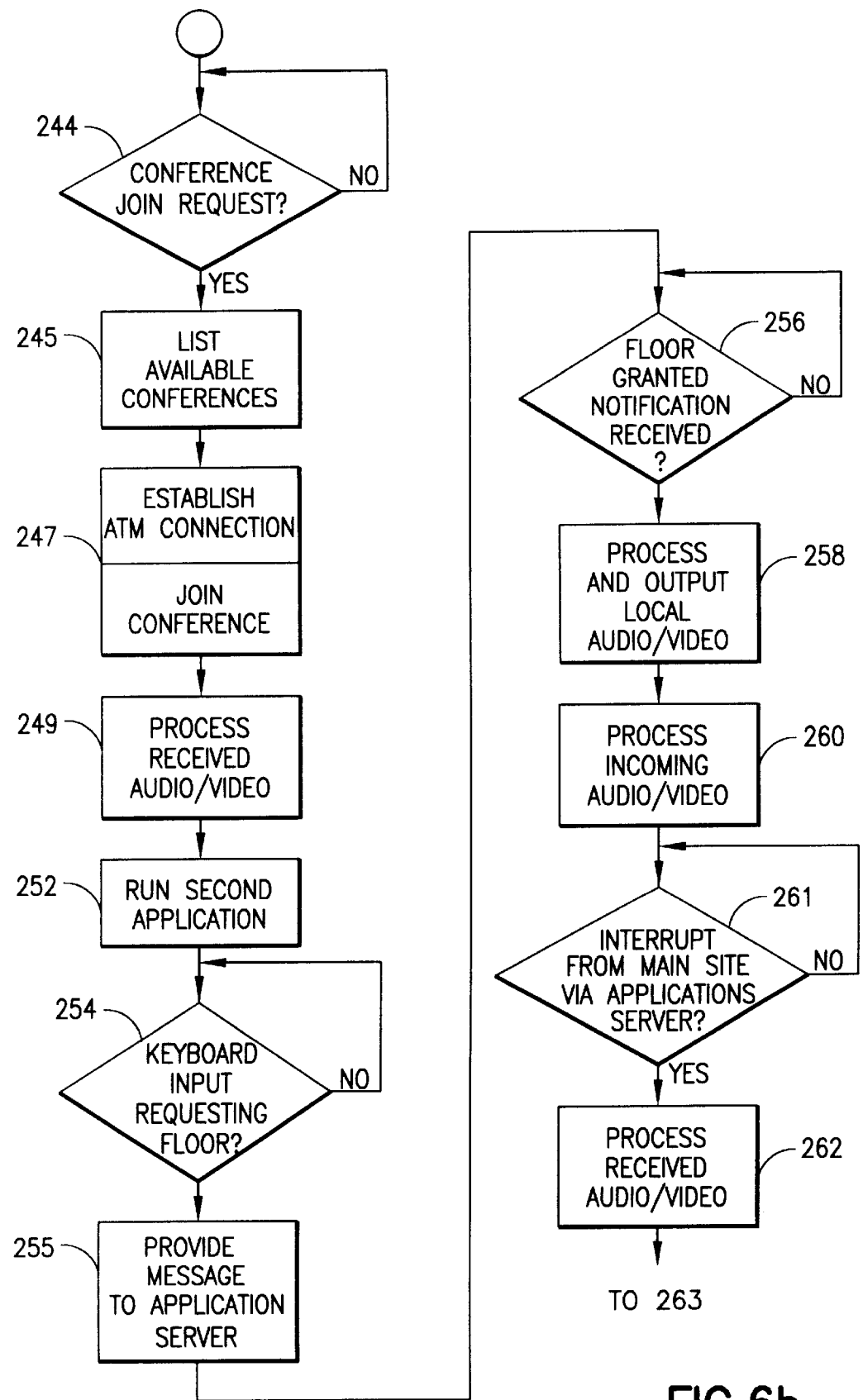
FIG. 6b is a high level flow diagram for the remote distance learning function of the microprocessor for a remote site of the application of FIG. 4.

According to the invention, when a site 110 wishes to establish multimedia multipoint conference among multiple sites, the initiating site provides information via the ETHERNET regarding the participants and timing to the applications server 120 in a manner well known in the art. The applications server 120 for purposes of this invention is preferably a workstation such as a SPARC workstation sold by SUN MICROSYSTEMS, provided with suitable reservations software. The reservation software client residing on the microprocessor 178 of the conference sites which is discussed in more detail below with reference to FIG. 6*a*, is preferably software such as available from General DataComm, Inc. under the product name MULTIMEDIA ONE except that the output is provided to the application server rather than an MMU. The application server reservation software discussed in more detail below with reference to FIG. 6*b* is substantially simpler than similar software on an MMU, as no bridging of video or audio is required. Rather, what is required is that the application server 120 communicate with the network manager 130 (preferably an NMS 3000 sold by General DataComm, Inc.) at the conference time regarding the details of the conference, and requesting that a plurality of SPVC multicast trees be set up. As is now known in the art, an SPVC, which was first created in, and is preferably implemented using an APEX switch sold by General DataComm, Inc., of Middlebury, Conn., is established by the switch as opposed to the "user", and essentially constitutes a cross between a PVC and an SVC in that the path within the establishing switch is set up substantially as a PVC, but the path through the network is an SVC-type path. In other words, a virtual connection in the originating switch (and from the switch to the user) is predetermined, while the virtual connections from the originating switch to the destination(s) are non-deterministic switched connections.

Thus, in accord with a critical aspect of the invention, the applications server 120 provides information (typically using SNMP commands) to the network manager 130 which establishes (sets up) a plurality of SPVCs in the form of multicast trees (seen in FIGS. 5*a*–5*d*). Each multicast tree is from a participating site to all other sites in the conference, and utilizes the ability of ATM network switches 160 to multicast, where applicable. It is noted in FIGS. 5*a*–5*d* that technically, for SPVCs, only the connection within the originating switch (and hence between the originating switch and a next switch) is preset (like a PVC), as all further connections are switched connections (like SVCs) as opposed to preset connections (like PVCS).

Figure 5A:
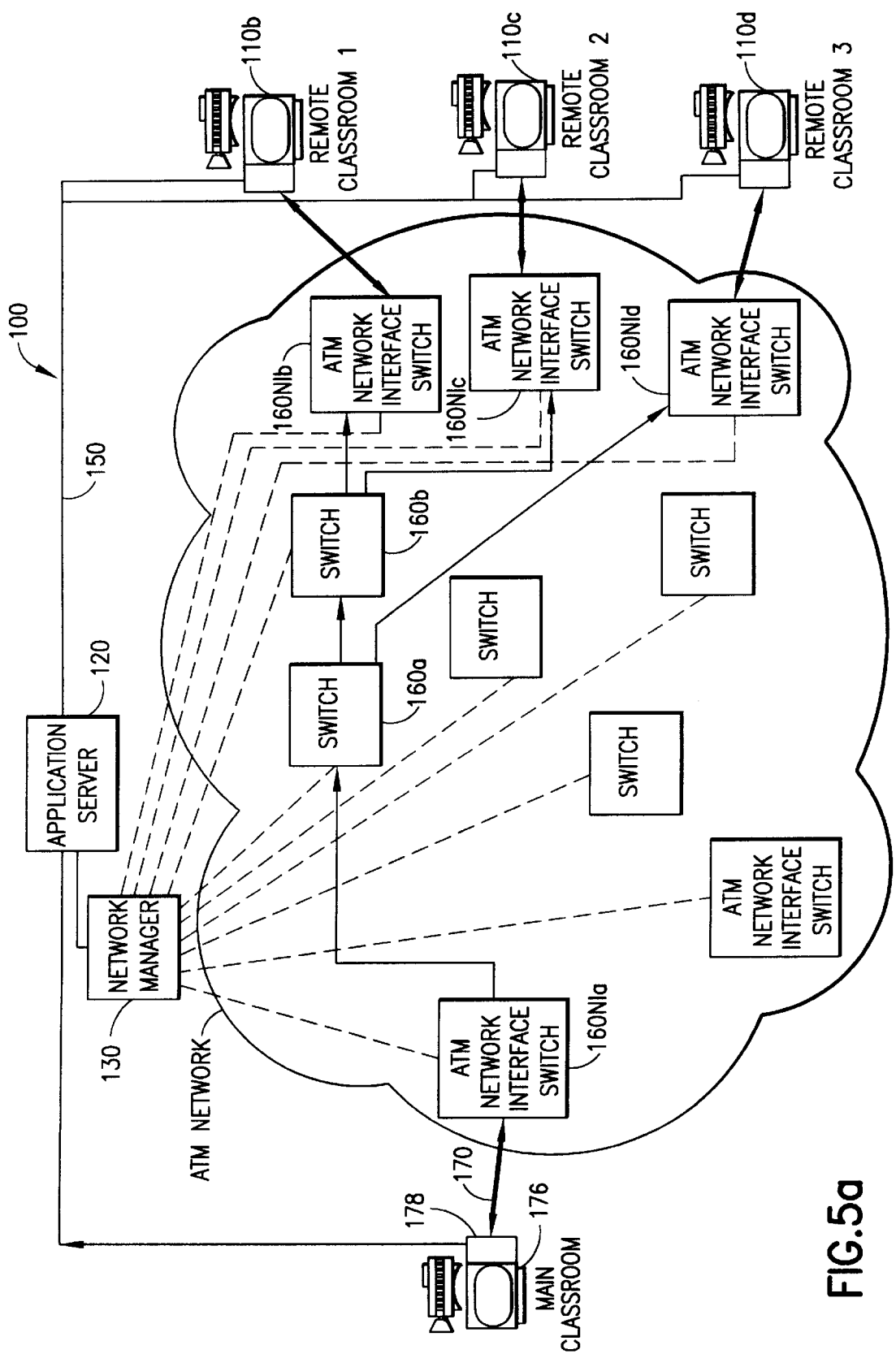
FIGS. 5a–5d are high level block diagrams showing four different multicast tree delivery switch arrangements for the remote distance learning application of FIG. 4.

Turning now to FIG. 5*a*, a first SPVC multicast tree from the main conference site 110*a* to the remote sites 110*b*, 110*c*, and 110*d* is seen. In particular, audio and video information from the main site 110*a* is provided to the ATM network interface switch 160NI*a* which places the signal information into ATM format. The interface switch 160NI*a* multicasts the signal, and sends one copy of the signal to the site 110*a* for viewing, and another copy of the signal to switch 160*a*. Switch 160*a*, having been provided with destinations 160NI*b*–160NI*d* in turn, multicasts the information to switches 160*b* and the ATM network interface switch 160NI*d*. Switch 160NI*d* provides the information in appropriate format (via the DS3 line) to the remote site 110*d*, while switch 160*b* multicasts the information to ATM network interface switches 160NI*b* and 160NI*c*. The ATM network interface switches 160NI*b* and 160NI*c* provide the information in appropriate format to remote sites 110*b* and 110*c*.

Figure 5B:
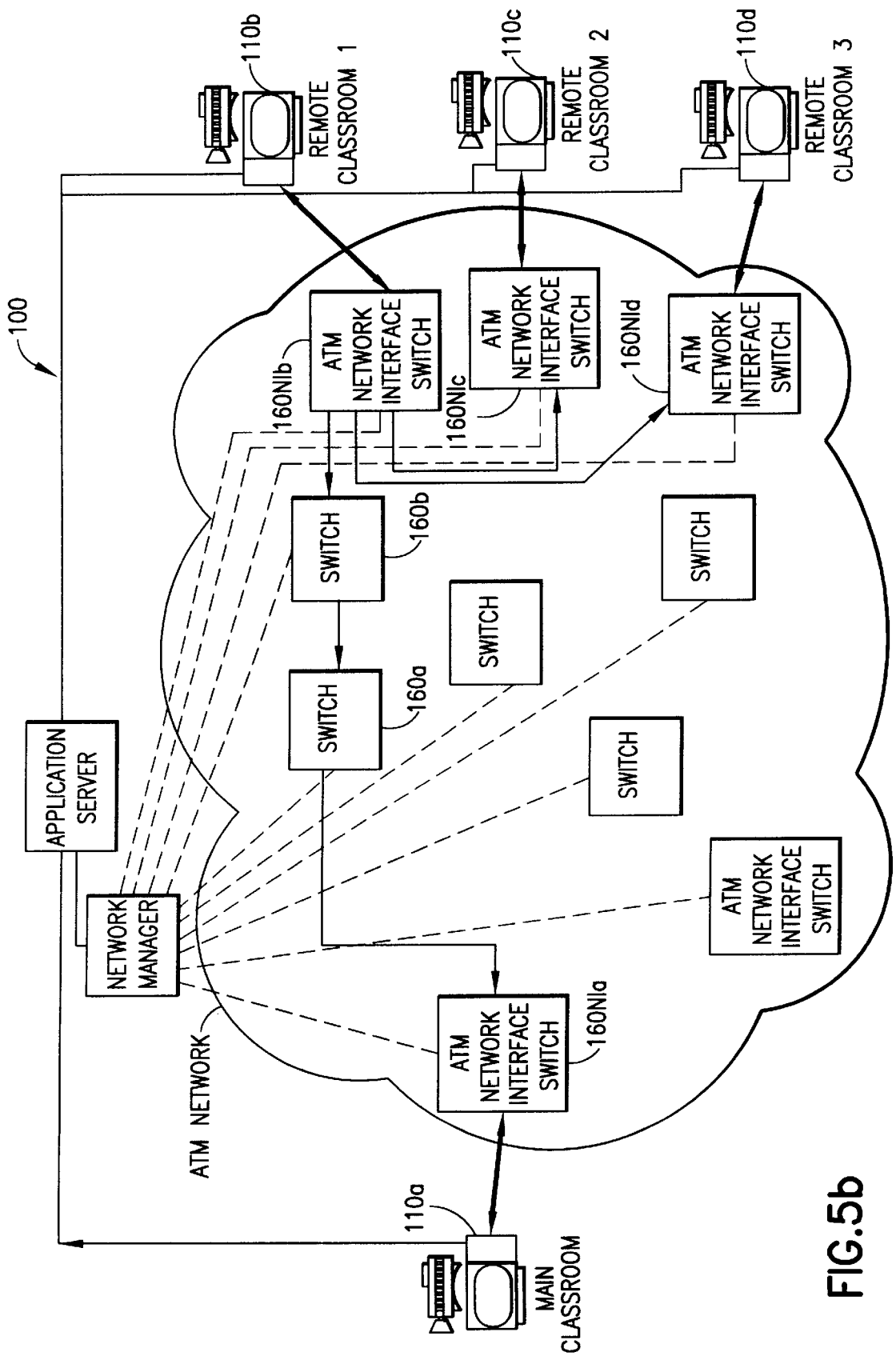
Figure 5C:
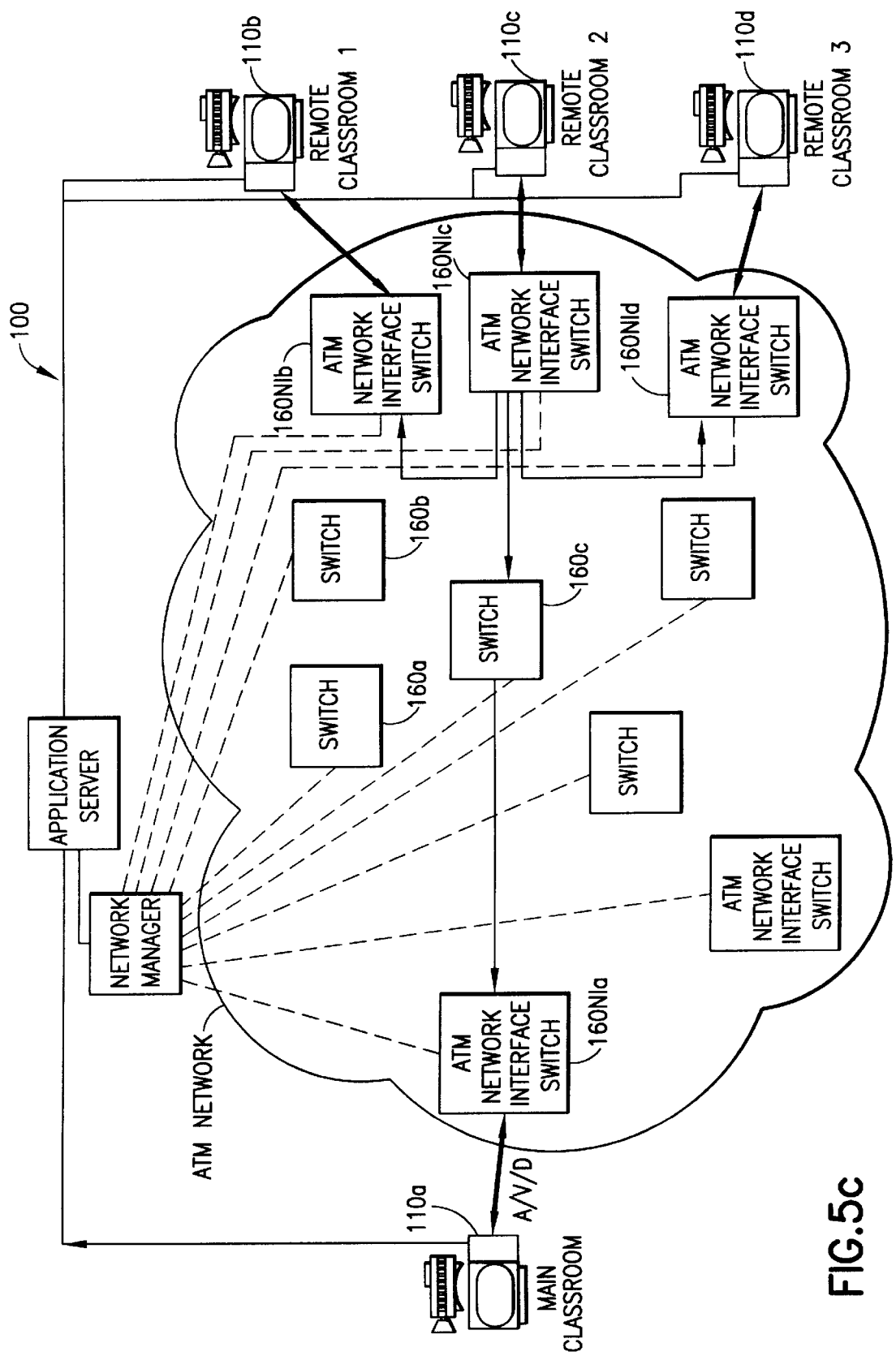
Figure 5D:
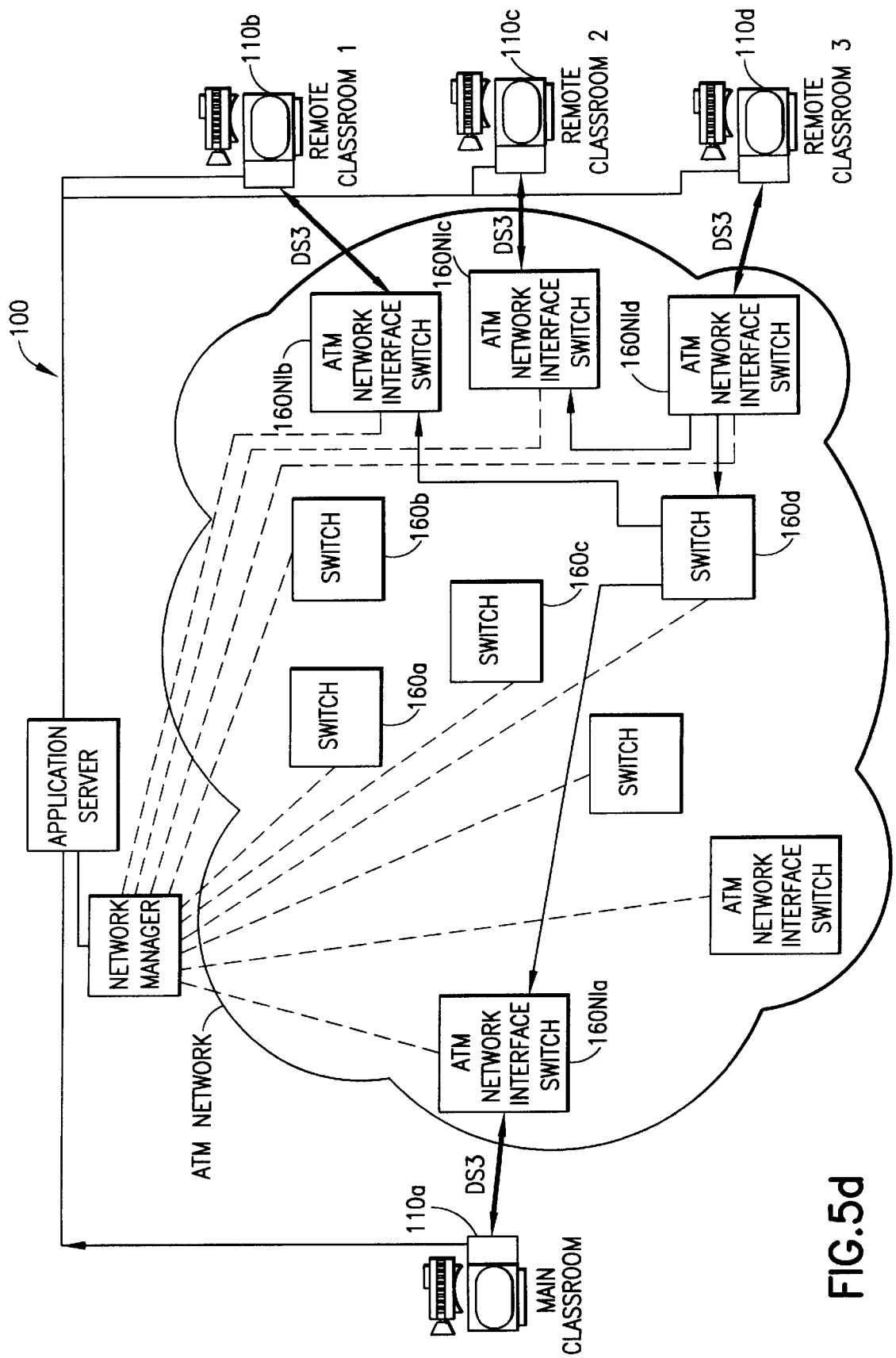

As seen in FIGS. 5*b*–5*d*, three additional SPVC multicast trees are also generated, from each of the remote sites 110*b*, 110*c*, and 110*d*, to each of the other remote sites and to the main site. Thus, in FIG. 5*b*, it is seen that information from "originating" remote site 110*b* is received by ATM network interface switch 160NI*b*, copied by the switch 160NI*b* for return to site 110*b*, and multicast to "destination" interface network switches 160NI*c* and 160NI*d* and to switch 160*b*. ATM network interface switches 160NI*c* and 160NI*d* forward the information to the remote sites 110*c* and 110*d*, while switch 160*b*, using a destination address of switch 160NI*a* forwards the information to main site 110*a* via switches 160*a* and 160NI*a*. Similarly, in FIG. 5*c*, it is seen that information from "originating" remote site 110*c* is received by ATM network interface switch 160NI*c* and multicast to "destination" interface network switches 160NI*a* and 160NI*d* and to switch 160*c* (as well as back to remote site 110*c*). ATM network interface switches 160NI*b* and 160NI*d* forward the information to the remote sites 110*b* and 110*d*, while switch 160*c*, using a destination address of switch 160NI*a* forwards the information to main site 110*a* via switch 160NI*a*. In FIG. 5*d* it is seen that information from remote site 110*d* is received by "originating" ATM network interface switch 160NI*d* and multicast to "destination" interface network switch 160NI*c* and to switch 160*d* (and back to remote site 110*d*). ATM network interface switch 160NI*c* forwards the information to the remote site 110*c*, while switch 160*d*, using destination addresses 160NI*b* and 160NI*a* multicasts the information to network interface switches 160NI*b* and 160NI*a*. The network interface switches, in turn forwards the information to main site 110*a* and remote site 110*b*.

In accord with the invention, the conference session is established by the applications server 120 at the reserved time, with the applications server 120 notifying the network manager 130 to establish all appropriate SPVC connection trees (e.g., the trees of FIGS. 5*a*–5*d*). Any party may then join the conference by turning on their equipment and contacting the application server 120 via the ETHERNET 150. Typically, concurrent with the ATM conferencing, a first application is run by the processors 178 at all the remote sites which are party to the conference, and a second application is run by the processor 178 of the main site. The remote site application utilizes the ETHERNET connection between the remote site and the application server and permits remote sites to request the "floor". The main site application similarly utilizes the ETHERNET connection between the main site and the application server and permits the main site to track requests from the remote sites for recognition. As discussed below with reference to FIGS. 6*a*–6*d*, the main site may recognize any of the requests via a command which is sent from the main site to the applications server 120, which causes the network manager 130 to activate the already set up, but non-activated multicast tree (e.g., FIG. 5*b*, 5*c*, or 5*d*) from the recognized site to the main site 110*a* and other sites, and to deactivate the previously activated multicast tree. As discussed below, according to the preferred embodiment of the invention, the main site may re-obtain control at any time by sending another command to the applications server 120 which causes the network manager 130 to reactivate the previous multicast tree (FIG. 5*a* from the main site to all remote sites), and deactivate the multicast tree from the recognized site.

Turning now to FIG. 6*a*, a flow diagram for the remote distance learning function of the microprocessor for the main site 110*a* is seen. At 202 and 204, the microprocessor awaits a conference reservation request, and conference join request respectively. If at 202, a conference reservation request is made, at 207, the user is prompted regarding information needed; e.g., date, time start, time end, conference participant "telephone" numbers, master site, etc. Upon obtaining the necessary reservation information, at 209 the microprocessor contacts the application server 120 via the ETHERNET, typically using a TCP/IP protocol, and requests a reservation. If the application server 120 is capable of handling the conference with the indicated parameters, a confirmation is provided at 211 to the user.

Returning to step 202, if no conference reservation request is made, the microprocessor goes to step 204, as at any time, the user may wish to join a conference. If no request to join a conference is made, the program returns to step 202 and keeps recycling. However, if the microprocessor receives a conference join request, at 215, the microprocessor provides the user with a screen listing of which conferences are running and available to the user. At 217, after the user provides a response, the connection to the ATM network is established, and the user is joined to the conference. Since, for purposes of the present invention, FIG. 6*a* relates to the programming of the microprocessor for a main site, the connection made at 217 is at the main site location. Thus, at 218, audio and video data generated at the main site is processed and forwarded by the processor to the ATM network interface switch. In accord with one embodiment of the invention, the information sent out over the DS3 link is also duplicated at the ATM network interface switch (i.e., before reaching the DS3 link) and returned to the microprocessor at 220 for display at the main site location. At 222 a second application is run for monitoring requests for the floor from the remote sites. The second application is preferably run over the ETHERNET, and provides the main site user (via the application server) at 223 with a list of those remote sites requesting the floor. The information may be displayed on a separate monitor or overlayed on the screen displaying the main site. At 225, the microprocessor awaits a selection input from the user as to which remote site is to receive the floor. Where a remote site already has the floor, the input at 225 can cause the main site to reassume the floor. Regardless, at 227, the microprocessor takes the input, and provides a message to the application server via the ETHERNET. The microprocessor then processes the incoming audio/video at 230 which may now be coming from a remote site, and, if applicable (e.g., when the input at 225 returned control to the main site), outputs its own audio and video information, and returns to step 223.

Turning to FIG. 6*b*, a high level flow diagram for the remote distance learning function of the microprocessor for a remote site is seen. While it will be appreciated that the remote site microprocessor will typically also be able to generate a conference reservation request, for purposes of simplicity, the remote site will be described with reference to joining and participating in a conference only. Thus, at 244 the microprocessor awaits an indication that the user wishes to join a conference. After receiving the request, at 245, the microprocessor provides the user with a screen listing which conferences are running and available to the user. At 247, after the user provides a response, the connection to the ATM network is established, and the user is joined to the conference. Since, for purposes of the present invention, FIG. 6*b* relates to the programming of the microprocessor for a remote site, the connection made at 247 is as a remote site location. Thus, at 249, the remote site microprocessor receives audio and video information from the main site (or any site having the floor) to an ATM network interface switch, and processes the audio and video information for receipt by the remote user. At 252 a second (remote site) application is run for permitting the remote site to request the floor. The second application is run over the ETHERNET, and permits the user to request the floor by providing an input at 254 to a keyboard. If the floor is requested, at 255, the microprocessor takes the input, and provides a message to the application server via the ETHERNET. The microprocessor then awaits notification at 256 that the remote site has been granted the floor. Then, at 258, the audio and video information generated at the remote site is processed and forwarded by the microprocessor to its associated ATM network interface switch. The information sent out is also received back and processed by the microprocessor at 260 for display at the main site location. At 261, the microprocessor checks for an interrupt from the application server which would indicate that the main site has caused the floor to change to another site. Upon receiving an interrupt, the microprocessor at 262 processes the new audio/video being received, and the program then returns to step 254 and awaits another keyboard input.

Figure 6C:
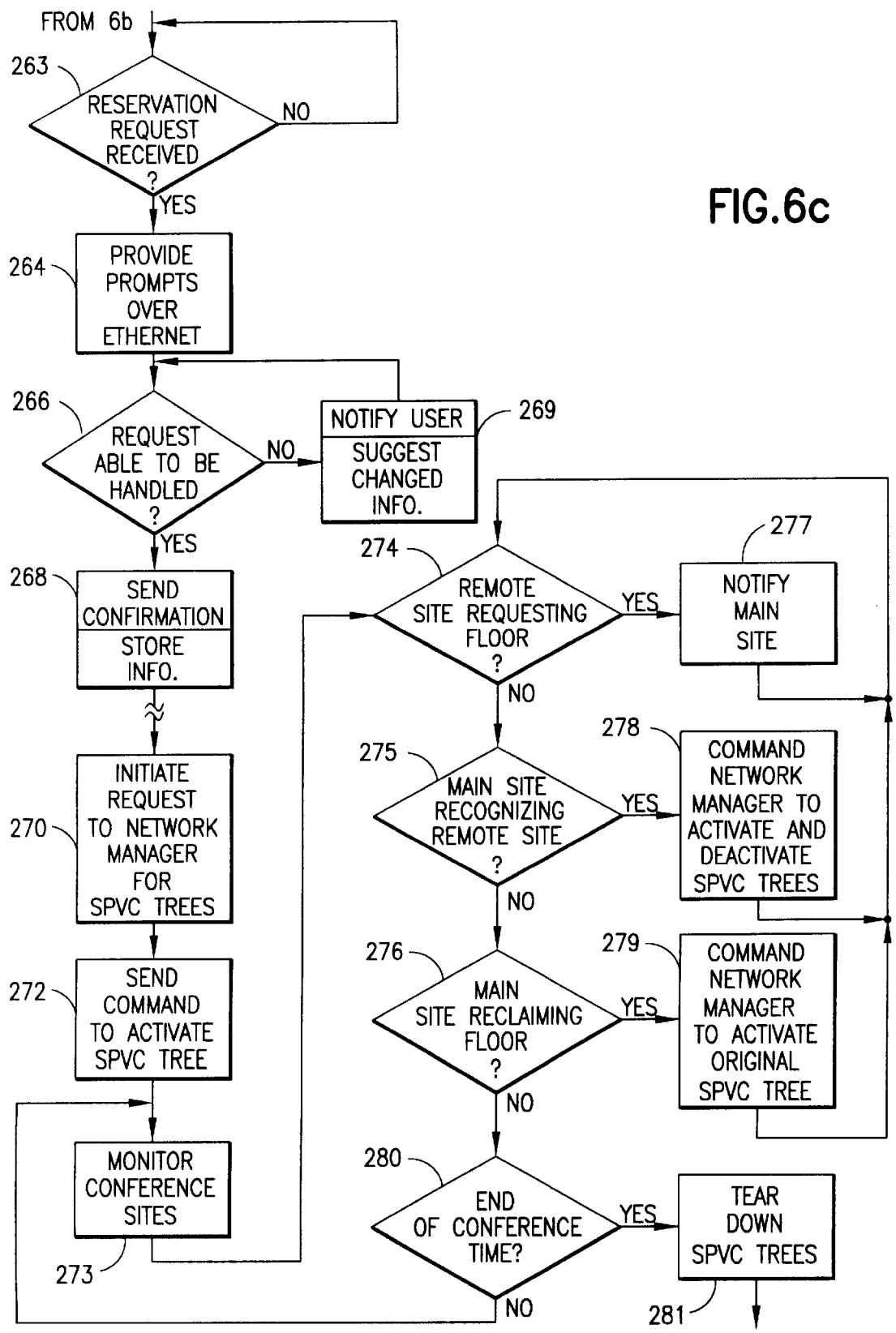
FIG. 6c is a high level flow diagram for the microprocessor of the application server of the remote distance learning application of FIG. 4.

As discussed above, in accord with the invention, the multipoint multimedia conference session is controlled by the application server. As seen in FIG. 6c, the application server has two primary functions: reservation manager, and SPVC multicast tree initiator/controller. Thus, at 263 the application server awaits a reservation request. When a conference reservation request is received, the application server microprocessor at 264 provides data over the ETHERNET to the reservation requesting user which prompts the user for the needed information; e.g., date, time start, time end, conference participant "telephone" numbers, master site, etc. Upon obtaining the necessary reservation information, at 266 the application server microprocessor determines whether it can handle the request, and if so, at 268 sends a confirmation to the user and stores the information in memory (not shown). If the request cannot be handled, at 269, the user is notified of the same and is asked to enter a different start or end time, or different date. The program then continues at 266.

At the designated reserved conference time, the application server microprocessor initiates at 270 a request to the network manager to set up a plurality of SPVC trees such as the multicast trees shown in FIGS. 5a–5d. The request is preferably made utilizing SNMP commands. Prior to the request, the application server can obtain information from the network manager regarding the ATM switch network configuration in order to determine the multicast tree structures. Alternatively, the network manager can generate the SPVC trees upon receiving the necessary information from the application server. Regardless, after the SPVC trees are established, at 272, the application server sends commands to the network manager to activate one of the SPVC trees (typically from the main site to all other sites). At 273, the application server monitors all sites to the conference. Thus, the application server checks to see at 274 whether a request for the floor is being received from a remote site, at 275, whether the main site is recognizing a remote site, and at 276, whether the main site is reclaiming the floor. If a request for the floor is received at 274, then at 277, the application server forwards that request to the main site. If the main site recognizes the request of a remote site at 275, then at 278, the application server sends an SNMP command to the network manager to deactivate the active SPVC tree, and to activate another generated (but inactive) SPVC tree. If the main site wishes to reclaim the floor at 276, then at 279, the application server sends an SNMP command to the network manager to deactivate the currently activated SPVC tree and to reactivate the original tree. If the conference time is over, as indicated at 280, the application server sends another message to the network manager to terminate the calls by dropping the SPVC trees at 281; at which point the SPVC trees are torn down (as discussed with reference to FIG. 6d). It the conference is not over, the program returns to step 273.

It should be appreciated with reference to FIG. 6c, that at any time, any user coupled to the application server can request to be added to a conference, even if no reservation was made for that user. In such a case, provided that the conference participants agreed that other parties could be added, and provided that the application server has the necessary resources available, the application server can generate a new SPVC tree and add "branches" to existing SPVC trees and forward instructions to the network manager to generate and activate the new tree in order to accommodate the additional participant. In a like manner, at any time, a request can be made to extend the length of a conference. This request should almost always receive agreement, as it is expected that in most, if not all situations, the resources of the application server will not be severely taxed because the application server does not have to mix or otherwise process complex audio and video signals. Thus, the primary function of the application server will be to cause the network manager to formulate and then activate and deactivate SPVC trees during conferences.

Figure 6D:
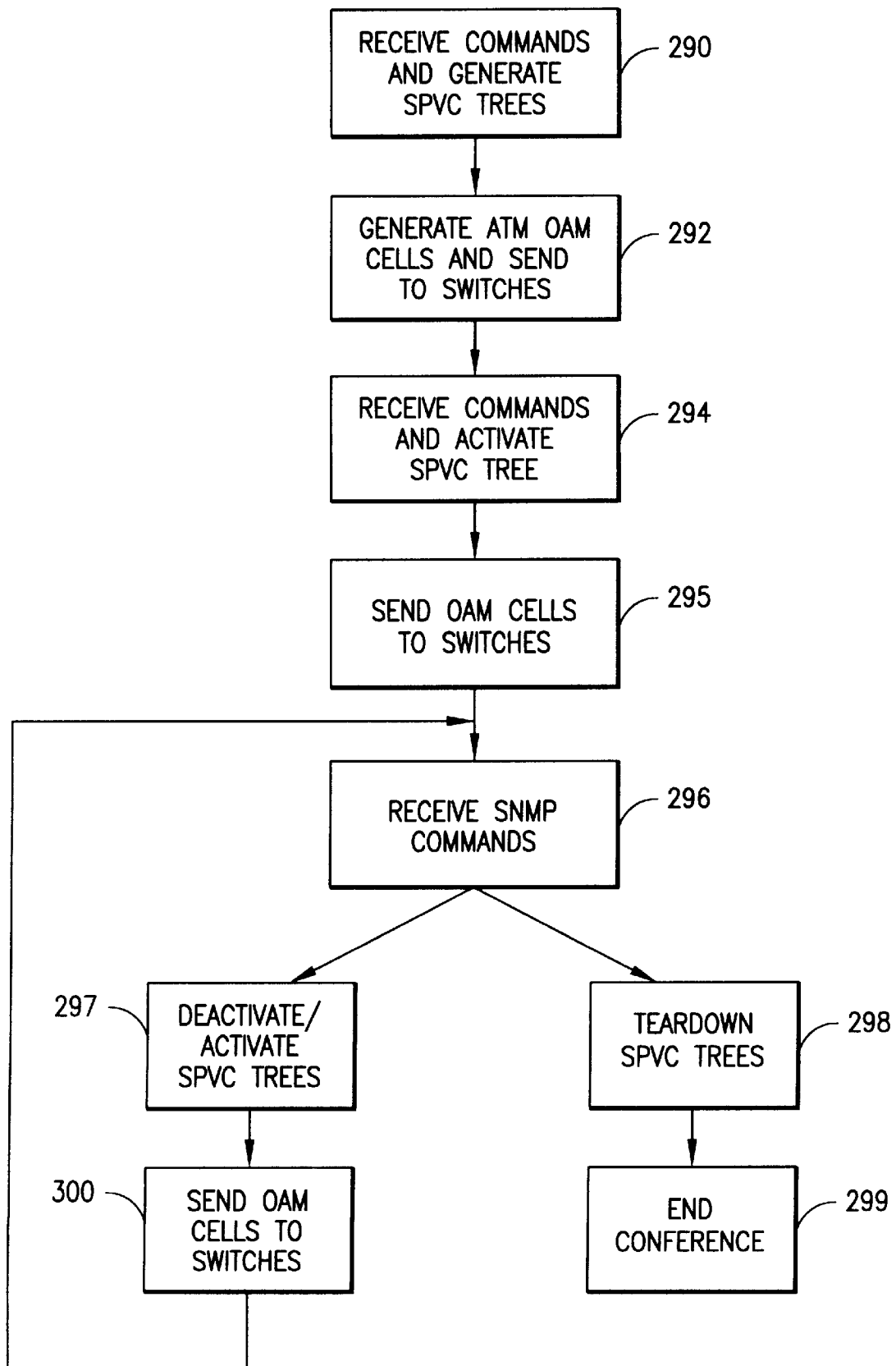
FIG. 6d is a high level flow diagram for the remote distance learning function of the microprocessor of the network manager of FIG. 4.

Turning now to FIG. 6d, a high level flow diagram for the remote distance learning function of the microprocessor of the network manager is seen. At 290, the network manager receives SNMP commands from the application server to generate a series of SPVC trees. At 292, the network manager, utilizing the MOLN (management overlay network) generates control information (e.g., ATM control cells) for communicating with one or more of the switches involved in the SPVC trees. The control information is used to cause at least the originating switches to set up the proper connections used in implementing the SPVC trees, as well as implementing multicasting in certain switches where desirable or applicable. At 294, the network manager receives an SNMP command from the application server to activate one of the SPVC trees, and in response to the command, at 295, the network manager sends control cells to the appropriate ATM switches. At 296, the network manager receives an SNMP command from the application server. The SNMP command is either to deactivate the active SPVC tree and activate another SPVC tree, at 297, or tear down the SPVC tree, at 298. If the SNMP command is to tear down the SPVC tree, the multimedia conference is ended, at 299. If the SNMP command is to deactivate/activate, the network manager sends, at 300, ATM control cells to the appropriate ATM switches and receives more commands, at 296.

Those skilled in the art will appreciate that the network manager which is preferably an NMS 3000 network manager of General DataComm, Inc., performs numerous other functions which are not shown.

According to an alternative embodiment of the invention, besides establishing a plurality of multicast trees which are deactivated and activated by the application server and network manager in response to commands from the main site, additional simultaneous connections between the remote sites and the main site may be established. Thus, in accord with a first arrangement, in addition to the SPVC tree, a plurality of additional simultaneous connections are maintained, with the main site using a separate monitor (not shown) for each remote site. In other words, in addition to the SPVC tree, one-way SVC or SPVC multimedia connections are established between each remote site and the main site. In this manner, the main site can monitor (see and hear) all of the remote sites simultaneously. The remote sites, on the other hand only receive the picture and sound from the site being broadcast via the SPVC tree set up by the application server and network manager.

According to a second arrangement of the alternative embodiment, in addition to the SPVC tree, only one simultaneous SVC or SPVC multimedia connection is maintained at a time, with the main site including a single monitor and a polling application for viewing the remote sites consecutively.

There have been described and illustrated apparatus and methods for conducting ATM multimedia multipoint conferencing using multicast tree switching. While particular embodiments of the invention have been described, it is not intended that the invention be limited thereto, as it is intended that the invention be as broad in scope as the art will allow and that the specification be read likewise. Thus, while particular apparatus (e.g., NMS 3000, APEX switches, SUN SPARC workstations) were described as being preferred for implementing the invention, it will be appreciated that other apparatus could be utilized. Also, while the invention was described as utilizing an ETHERNET LAN/WAN connection from each of the multimedia sites to the application server for purposes of reservations and conference control, it will be appreciated that other LAN or WAN connections, out-of-band ATM connections, or non-ATM-networks could be utilized for conference control. Likewise, other LAN or WAN connections, and even switch network connections can be used for purposes of reservations. Further, while the invention was described with reference to multicast SPVC trees, it will be appreciated that, while less preferred, switched multicast PVC trees can be utilized for conferencing purposes. In addition, it should be appreciated by those skilled in the art that while the invention was described with reference to a specific number of sites, switches, etc., different numbers of sites can be connected in a multimedia multipoint conference which can be used for learning and other applications. In addition, while particular flowcharts for the software of the microprocessors located at the main site, remote sites, application server, and network manager were provided, it will be appreciated that the functions described can be accomplished in many different ways. Further yet, while different embodiments, where the main site sees itself, or the remote sites in different manners were described, it will be appreciated that other arrangements are possible. For example, rather than the main site seeing itself via a loopback at the network interface switch, equipment could be used at the site itself to provide the local picture. It will therefore be appreciated by those skilled in the art that yet other modifications could be made to the provided invention without deviating from its spirit and scope as so claimed.

What is claimed is:

1. A multimedia multipoint conferencing system for connecting at least three multimedia conferencing equipment means coupled to an ATM network having a plurality of ATM switches and a network manager coupled to the ATM switches, said conferencing system comprising:

a) an application server means coupled to said at least three multimedia conferencing equipment means via out-of-band connections, and coupled to the network manager, said application server means for providing information to said network manager;

b) a communication means resident in each multimedia conferencing equipment means, each communication means for communicating with the application server via the out-of-band connections, wherein in response to a message from one of said communication means, said application server means provides said information to the network manager and causes said network manager to establish a plurality of sets of virtual connections among the plurality of ATM switches, each of said plurality of sets of virtual connections connecting one of the at least three multimedia conferencing equipment means to the others of the at least three multimedia conferencing equipment means, wherein, in response to said message from one of said communications means, said application server provides said information to the network manager which causes said network manager to deactivate an active one of said plurality of sets of virtual connections and to activate a deactivated other of said plurality of sets of virtual connections.

2. A multimedia multipoint conferencing system for connecting at least three multimedia conferencing equipment means coupled to an ATM network having a plurality of ATM switches and a network manager coupled to the ATM switches, said conferencing system comprising:

a) an application server means coupled to said at least three multimedia conferencing equipment means via out-of-band connections, and coupled to the network manager, said application server means for providing information to said network manager;

b) a communication means resident in each multimedia conferencing equipment means, each communication means for communicating with the application server via the out-of-band connections, wherein in response to a message from one of said communication means, said application server means provides said information to the network manager and causes said network manager to establish a plurality of sets of virtual connections among the plurality of ATM switches, each of said plurality of sets of virtual connections connecting one of the at least three multimedia conferencing equipment means to the others of the at least three multimedia conferencing equipment means, and in response to said message from one of said communications means, said application server provides said information to the network manager which causes the network manager to deactivate all others of said plurality of sets of virtual connections and to activate one of said plurality of sets of virtual connections, and in response to another message from one of said communications means, said application server provides said information to the network manager which causes the network manager to deactivate said active one of said plurality of sets of virtual connections and to activate another of said plurality of sets of connections.

3. A multimedia multipoint conferencing system for connecting at least three multimedia conferencing equipment means coupled to an ATM network having a plurality of ATM switches and a network manager coupled to the ATM switches, said conferencing system comprising:

a) an application server means coupled to said at least three multimedia conferencing equipment means via out-of-band connections, and coupled to the network manager, said application server means for providing information to said network manager;

b) a communication means resident in each multimedia conferencing equipment means, each communication means for communicating with the application server via the out-of-band connections, wherein in response to a message from one of said communication means, said application server means provides said information to the network manager and causes said network manager to establish a plurality of sets of virtual connections among the plurality of ATM switches, each of said plurality of sets of virtual connections connecting one of the at least three multimedia conferencing equipment means to others of the at least three multimedia conferencing equipment means, and wherein each set of said plurality of sets of virtual connections comprises a Semi-permanent Virtual Connection (SPVC) tree.

4. A multimedia multipoint conferencing system according to claim 3, wherein:

each SPVC tree is an SPVC multicast tree.

5. A multimedia multipoint conferencing system according to claim 1, wherein:

one of said communications means establishes one of the at least three multimedia conferencing equipment means as a main site, others of said communications means establishing others of the at least three multimedia conferencing equipment means as remote sites.

6. A multimedia multipoint conferencing system according to claim 5, wherein:

in response to a second message from said communication means of a remote site, said application server provides control information to said multimedia conferencing equipment means of said main site.

7. A multimedia multipoint conferencing system according to claim 5, wherein:

each set of said plurality of sets of virtual connections comprises a Semi-permanent Virtual Connection (SPVC) tree.

8. A multimedia multipoint conferencing system according to claim 7, wherein:

said out-of-band connections comprise a LAN or WAN.

9. A multimedia multipoint conferencing system according to claim 8, wherein, said LAN or WAN comprises an ETHERNET connection.

10. A multimedia multipoint conferencing system according to claim 1, wherein:

said out-of-band connections comprise a LAN or WAN.

11. A multimedia multipoint conferencing system according to claim 10, wherein, said LAN or WAN comprises an ETHERNET connection.

12. A multimedia multipoint conferencing system according to claim 5, wherein:

said communication means of said main site includes reservation request means for forwarding a reservation request to said application server, said reservation request including conference time data, and said application server means includes reservation setup means for receiving said reservation request from said application server, wherein said application server means provides said information to the network manager and causes said network manager to establish a plurality of connections among the plurality of ATM switches at a time based on said conference time data.

13. A multimedia multipoint conferencing system coupled to an ATM network having a plurality of ATM switches, said conferencing system comprising:

a) a network manager coupled to the ATM switches;

b) an application server means coupled to said network manager for providing information to said network manager;

c) at least three multimedia conferencing equipment means coupled to the ATM network, each multimedia conferencing equipment means including communication means for communicating out-of-band with said application server, wherein in response to a message from one of said communication means, said application server means provides said information to said network manager and causes said network manager to establish a plurality of virtual connections among the plurality of ATM switches thereby connecting each of said at least three multimedia conferencing equipment means to all others of said at least three multimedia conferencing equipment means over the ATM network said plurality of virtual connections comprising Semi-permanent Virtual Connection (SPVC) trees, with only one of said SPVC trees being activated at a time.

14. A multimedia multipoint conferenceing system according to claim 13, wherein:

said communication means for communicating out-of-band comprises ETHERNET connection means.

15. A multimedia multipoint conferencing system according to claim 13, wherein:

said SPVC trees are SPVC multicast trees.

16. A method of conducting a multimedia multipoint conference utilizing a system having an ATM network with a plurality of ATM switches, at least three multimedia conferencing equipment means coupled to the ATM network, an application server coupled to the at least three multimedia conferencing equipment means via an out-of-ATM-band connection means, a network manager means coupled to the application server and to the ATM switches, said at least three multimedia conferencing equipment means including communications means for communicating with the application server via the out-of-ATM-band connection means, said method comprising:

a) using said application server and network manager to generate a plurality of sets of virtual connections through the ATM network, each particular set of virtual connections representing a connection from a particular one of said at least three multimedia conferencing equipment means to others of said at least three multimedia conferencing equipment means;

b) based on information forwarded to said application server from a multimedia conferencing equipment means during a conference, at a first time, activating a first one of said plurality of sets and deactivating others of said plurality of sets, and at a second time deactivating said first one and others of said plurality of sets and activating another of said plurality of sets.

17. A multimedia multipoint conferencing system according to claim 2, wherein:

said out-of-band connections comprise a LAN or WAN.

18. A multimedia multipoint conferencing system according to claim 17, wherein:

said LAN or WAN comprises an ETHERNET connection.

19. A multimedia multipoint conferencing system according to claim 3, wherein:

said out-of-band connections comprise a LAN or WAN.

20. A multimedia multipoint conferencing system according to claim 19, wherein:

said LAN or WAN comprises an ETHERNET connection.

* * * * *